US011134052B2

(12) United States Patent
Surcouf et al.

(10) Patent No.: US 11,134,052 B2
(45) Date of Patent: Sep. 28, 2021

(54) TEMPLATE-COMPATIBLE ENCODING FOR CONTENT CHUNK AGGREGATION AND MAPPING

(71) Applicant: Cisco Technology, Inc., San Jose, CA (US)

(72) Inventors: Andre Jean-Marie Surcouf, St Leu la Foret (FR); William Mark Townsley, Paris (FR)

(73) Assignee: CISCO TECHNOLOGY, INC., San Jose, CA (US)

(*) Notice: Subject to any disclaimer, the term of this patent is extended or adjusted under 35 U.S.C. 154(b) by 141 days.

(21) Appl. No.: 16/094,963

(22) PCT Filed: Apr. 17, 2017

(86) PCT No.: PCT/US2017/027996
§ 371 (c)(1),
(2) Date: Oct. 19, 2018

(87) PCT Pub. No.: WO2017/184526
PCT Pub. Date: Oct. 26, 2017

(65) Prior Publication Data
US 2019/0104059 A1    Apr. 4, 2019

Related U.S. Application Data

(60) Provisional application No. 62/324,696, filed on Apr. 19, 2016, provisional application No. 62/324,710, (Continued)

(30) Foreign Application Priority Data

Jan. 11, 2017 (GB) ..................................... 1700470

(51) Int. Cl.
*H04L 29/12*    (2006.01)
*G06F 16/955*    (2019.01)
(Continued)

(52) U.S. Cl.
CPC ........ *H04L 61/1511* (2013.01); *G06F 16/245* (2019.01); *G06F 16/955* (2019.01);
(Continued)

(58) Field of Classification Search
CPC ......... H04L 29/06; H04L 29/08; H04L 29/12; H04L 12/745; H04L 61/1511;
(Continued)

(56) References Cited

U.S. PATENT DOCUMENTS 6,594,260 B1    7/2003 Aviani, Jr. et al.
6,694,471 B1    2/2004 Sharp
(Continued)

FOREIGN PATENT DOCUMENTS

EP         2938046 A1    10/2015
WO    WO2016011459    *  1/2016
WO     2016019041 A1    2/2016

OTHER PUBLICATIONS

Examination report dated Sep. 18, 2019 in application EP 17 733 135.2-1213 (10 Pages).
(Continued)

*Primary Examiner* — Aftab N. Khan
(74) *Attorney, Agent, or Firm* — Merchant & Gould P.C.

(57) ABSTRACT

A method of enabling access to content in a network implementing Internet Protocol version 6 (IPv6) is described, the method including accessing a content addressing file including entries each comprising a content portion location associated with the content portion. The content portion location associated with the content portion is extracted for an entry and, based on the content portion location, a section of an IPv6 address for the content portion is formed. Methods of addressing content for storage and retrieving content are also described.

17 Claims, 4 Drawing Sheets

Related U.S. Application Data filed on Apr. 19, 2016, provisional application No. 62/324,657, filed on Apr. 19, 2016, provisional application No. 62/324,727, filed on Apr. 19, 2016, provisional application No. 62/324,721, filed on Apr. 19, 2016, provisional application No. 62/340,156, filed on May 23, 2016, provisional application No. 62/340,182, filed on May 23, 2016, provisional application No. 62/340,162, filed on May 23, 2016, provisional application No. 62/340,174, filed on May 23, 2016, provisional application No. 62/340,166, filed on May 23, 2016.

(51) Int. Cl.

| | | |
|---|---|---|
| *H04L 12/749* | (2013.01) | |
| *H04L 12/745* | (2013.01) | |
| *H04L 12/747* | (2013.01) | |
| *H04L 29/08* | (2006.01) | |
| *H04L 12/28* | (2006.01) | |
| *H04L 29/06* | (2006.01) | |
| *H04N 21/2343* | (2011.01) | |
| *H04N 21/658* | (2011.01) | |
| *H04N 21/643* | (2011.01) | |
| *H04N 21/845* | (2011.01) | |
| *H04L 12/723* | (2013.01) | |
| *H04L 12/721* | (2013.01) | |
| *H04L 12/725* | (2013.01) | |
| *H04N 21/262* | (2011.01) | |
| *G06F 16/245* | (2019.01) | |
| *H04L 12/743* | (2013.01) | |
| *H04L 12/26* | (2006.01) | |
| *H04L 12/741* | (2013.01) | |
| *H04N 21/2662* | (2011.01) | |

(52) U.S. Cl.
CPC .... *H04L 12/2803* (2013.01); *H04L 29/06163* (2013.01); *H04L 29/06517* (2013.01); *H04L 29/08045* (2013.01); *H04L 43/0876* (2013.01); *H04L 45/306* (2013.01); *H04L 45/34* (2013.01); *H04L 45/38* (2013.01); *H04L 45/50* (2013.01); *H04L 45/72* (2013.01); *H04L 45/741* (2013.01); *H04L 45/742* (2013.01); *H04L 45/745* (2013.01); *H04L 45/748* (2013.01); *H04L 45/7453* (2013.01); *H04L 45/7457* (2013.01); *H04L 61/103* (2013.01); *H04L 61/15* (2013.01); *H04L 61/1582* (2013.01); *H04L 61/2007* (2013.01); *H04L 61/251* (2013.01); *H04L 61/2503* (2013.01); *H04L 61/256* (2013.01); *H04L 61/304* (2013.01); *H04L 61/6059* (2013.01); *H04L 61/6063* (2013.01); *H04L 63/1416* (2013.01); *H04L 63/166* (2013.01); *H04L 63/168* (2013.01); *H04L 65/4084* (2013.01); *H04L 65/605* (2013.01); *H04L 65/608* (2013.01); *H04L 67/02* (2013.01); *H04L 67/1002* (2013.01); *H04L 67/1008* (2013.01); *H04L 67/2823* (2013.01); *H04L 67/2842* (2013.01); *H04L 67/322* (2013.01); *H04L 67/327* (2013.01); *H04L 69/22* (2013.01); *H04L 69/326* (2013.01); *H04N 21/23439* (2013.01); *H04N 21/26258* (2013.01); *H04N 21/64322* (2013.01); *H04N 21/6581* (2013.01); *H04N 21/845* (2013.01); *H04N 21/8456* (2013.01); *H04L 61/35* (2013.01); *H04L 61/6009* (2013.01); *H04L 65/4007* (2013.01); *H04L 65/602* (2013.01); *H04L 69/329* (2013.01); *H04L 2212/00* (2013.01); *H04N 21/2662* (2013.01)

(58) Field of Classification Search
CPC . H04L 65/608; H04L 61/1582; H04L 69/326; H04L 29/08045; H04L 61/6063; H04L 29/06517; H04L 61/103; H04L 61/304; H04L 45/50; H04L 45/38; H04L 45/34; H04L 61/6059; H04L 65/605; H04L 67/322; H04L 67/1002; H04L 67/327; H04L 67/2823; H04L 45/7453; H04L 45/7457; H04L 61/251; H04L 43/0876; H04L 61/256; H04L 63/1416; H04L 63/166; H04L 63/168; H04L 69/22; H04L 45/741; H04L 45/748; H04L 45/742; H04L 67/2842; H04L 12/2803; H04L 61/6009; H04L 65/602; H04L 61/35; H04L 65/4007; H04L 69/329; H04L 2212/00; H04L 65/80; H04L 67/1076; H04L 67/1078; H04L 67/108; H04L 65/60; H04L 12/2801; H04L 67/1097; H04L 12/56; H04L 45/74; H04L 45/64; H04L 61/6004; H04L 61/2528; H04L 61/10; H04L 65/4069; H04L 65/4084; H04L 61/2503; H04L 67/02; H04L 67/1008; H04L 45/745; H04L 45/72; H04L 61/2007; H04L 29/06163; H04L 45/306; H04L 61/15; G06F 17/30; G06F 16/245; G06F 16/955; H04N 21/262; H04N 21/658; H04N 21/845; H04N 21/64322; H04N 21/8456; H04N 21/23439; H04N 21/6581; H04N 21/2662; H04N 19/40; H04N 21/26258
See application file for complete search history.

(56) References Cited

U.S. PATENT DOCUMENTS

| | | |
|---|---|---|
| 8,243,735 B2 | 8/2012 | Jacobson et al. |
| 8,244,881 B2 | 8/2012 | Thornton et al. |
| 8,260,881 B1* | 9/2012 | Paleja ................. H04L 63/0823 709/218 |
| 8,467,405 B2 | 6/2013 | Suzuki |
| 8,549,167 B2 | 10/2013 | Vonog et al. |
| 9,116,893 B2* | 8/2015 | Welsh .................. H04N 21/278 |
| 9,160,809 B2* | 10/2015 | Carney .................. H04L 45/02 |
| 9,253,255 B1 | 2/2016 | Bosch et al. |
| 9,372,778 B1 | 6/2016 | Duquene et al. |
| 9,712,412 B2 | 7/2017 | Schlack et al. |
| 9,756,124 B1 | 9/2017 | Bosch et al. |
| 9,832,291 B2 | 11/2017 | Solis et al. |
| 9,871,722 B2 | 1/2018 | Ou et al. |
| 9,948,550 B2 | 4/2018 | Ge et al. |
| 9,948,557 B2 | 4/2018 | Fan et al. |
| 9,960,999 B2 | 5/2018 | Azgin et al. |
| 10,158,570 B2 | 12/2018 | Moiseenko et al. |
| 10,313,415 B2 | 6/2019 | Surcouf et al. |
| 10,404,537 B2 | 9/2019 | Fox et al. |
| 10,440,161 B2 | 10/2019 | Solis et al. |
| 11,012,530 B2* | 5/2021 | Shribman ............... H04L 67/32 |
| 2002/0116594 A1 | 8/2002 | Cox |
| 2003/0225912 A1* | 12/2003 | Takeda .............. H04L 29/12556 709/246 |
| 2005/0182829 A1 | 8/2005 | King et al. |
| 2006/0256817 A1 | 11/2006 | Durst |
| 2009/0282159 A1 | 11/2009 | Wang et al. |
| 2009/0285209 A1 | 11/2009 | Stewart et al. |
| 2009/0287835 A1 | 11/2009 | Jacobson |
| 2009/0288163 A1 | 11/2009 | Jacobson et al. |
| 2010/0061369 A1 | 3/2010 | Suzuki |

(56) References Cited

U.S. PATENT DOCUMENTS

| | | |
|---|---|---|
| 2011/0252082 A1 | 10/2011 | Cobb et al. |
| 2011/0280216 A1 | 11/2011 | Li et al. |
| 2012/0331089 A1 | 12/2012 | Vonog |
| 2013/0041972 A1 | 2/2013 | Field et al. |
| 2013/0173822 A1 | 7/2013 | Hong et al. |
| 2013/0227166 A1 | 8/2013 | Ravindran et al. |
| 2013/0275544 A1 | 10/2013 | Westphal |
| 2014/0019632 A1* | 1/2014 | Fall ............... H04L 65/608 709/231 |
| 2014/0023072 A1 | 1/2014 | Lee et al. |
| 2014/0052812 A1 | 2/2014 | Ozawa |
| 2014/0082123 A1* | 3/2014 | Hasuo ............. H04L 65/4084 709/213 |
| 2014/0289325 A1 | 9/2014 | Solis |
| 2014/0310339 A1 | 10/2014 | Yong et al. |
| 2015/0220836 A1* | 8/2015 | Wilson ............... H04L 67/18 706/46 |
| 2015/0248455 A1 | 9/2015 | Sevilla et al. |
| 2015/0317395 A1* | 11/2015 | Arkin ............... G06F 16/9535 707/706 |
| 2016/0021162 A1* | 1/2016 | Surcouf ............. H04N 21/238 709/219 |
| 2016/0021400 A1* | 1/2016 | Surcouf ............. H04L 65/602 725/93 |
| 2016/0036730 A1 | 2/2016 | Kutscher et al. |
| 2016/0119251 A1 | 4/2016 | Solis et al. |
| 2016/0234333 A1 | 8/2016 | Yeh et al. |
| 2016/0308823 A1 | 10/2016 | Maslak |
| 2016/0337426 A1 | 11/2016 | Shribman et al. |
| 2017/0031783 A1* | 2/2017 | Kedem ............. G06F 11/1471 |
| 2017/0134274 A1 | 5/2017 | Araújo |
| 2017/0154050 A1* | 6/2017 | Reimer ............. G06F 16/2322 |
| 2017/0169123 A1* | 6/2017 | Reshadi ............. G06F 16/957 |
| 2017/0201375 A1 | 7/2017 | Amin et al. |
| 2017/0277909 A1 | 9/2017 | Kraemer et al. |
| 2017/0302552 A1 | 10/2017 | Ward et al. |
| 2017/0302575 A1 | 10/2017 | Ward et al. |
| 2017/0302576 A1 | 10/2017 | Townsley et al. |
| 2017/0346788 A1 | 11/2017 | Jokela et al. |
| 2018/0103128 A1 | 4/2018 | Muscariello et al. |
| 2018/0241669 A1 | 8/2018 | Muscariello et al. |
| 2018/0241679 A1 | 8/2018 | Muscariello et al. |
| 2018/0242186 A1 | 8/2018 | Muscariello et al. |
| 2018/0242218 A1 | 8/2018 | Muscariello et al. |
| 2018/0367651 A1 | 12/2018 | Li et al. |
| 2019/0222619 A1 | 7/2019 | Shribman et al. |

OTHER PUBLICATIONS

Examination report dated Mar. 16, 2020 in application EP 17 733 142.8-1213 (11 Pages).

Examination report dated Mar. 16, 2020 in application EP 17 733 1.134.5-1213 (11 Pages).

Suman Srinivasan et al. "IPv6 Addresses as Content Names in Information-Centric Networking", Jun. 18, 2011 (Jun. 18, 2011), pp. 1-2, XP055404410, Columbia University, Retrieved from the Internet: URL:http://www.cs.columbia.edu/~hgs/papers/Srin1106_1Pv6.pdf.

Brian Field et al. "Integrating Routing with Content Delivery Networks", Computer Communications Workshops (INFOCOM WKSHPS), 2012 IEEE Conference on, IEEE, Mar. 25, 2012 (Mar. 25, 2012), pp. 292-297, XP032175746, DOI: 10.1109/INFCOMW.2012.6193508; ISBN: 978-1-4673-1016-1 (6 pages).

Abhishek Chanda et al. "ContentFLow: Adding Content Primitives to Software Defined Networks", Globecom 2013—Next Generation Networking Symposium; 978-1-4799-1353-4 (7 Pages).

C. Westphal et al. "Adaptive Video Streaming over ICN", Internet Draft, draft-irtf-icnrg-videostreaming-07, Feb. 16, 2016, 40 pages.

* cited by examiner

2001:420:44f1:1a01:c15c::ed72:1

| Movie/chunk address | :c15c:0000:cd72:0001 | |
|---|---|---|
| Stream type | :: | 3 |
| Service ID | :015c:: | 87 |
| Content descriptor | 0x0000:cd :: | 237 |
| Profile | ::70: | 14 |
| Duration | ::2:0 | 4 |

Fig. 4

TEMPLATE-COMPATIBLE ENCODING FOR CONTENT CHUNK AGGREGATION AND MAPPING

TECHNICAL FIELD

The present disclosure relates generally to content retrieval in a network, in particular in relation to issues that arise as networks transition from Internet Protocol (IP) version 4 (IPv4) to IP version 6 (IPv6) networks.

BACKGROUND

In a traditional IPv4 or IPv6 network, addressing schemes have been established based on the nodes of the network such that individual network nodes have associated local or globally-unique addresses. However, using IPv6, options arise for addressing in the network to be arranged around the information itself. Systems and methods described herein address issues arising from the interaction between these networking models, particularly in the retrieval of data or content from such networks.

BRIEF DESCRIPTION OF THE FIGURES

Embodiments of the method and apparatus described herein are illustrated in the Figures in which:

FIG. 4 illustrates schematically the structure of an exemplary IPv6 address.

DETAILED DESCRIPTION

Overview

Described herein is a method of enabling access to content in a network implementing Internet Protocol version 6 (IPv6), the method including accessing a content addressing file, the content addressing file comprising a plurality of entries, each entry comprising a content portion location associated with the content portion, extracting for an entry the content portion location associated with the content portion and forming based on the content portion location a section of an IPv6 address for the content portion.

Also described herein is a method of addressing content for storage in a storage node of a network implementing Internet Protocol version 6 (IPv6), the method including receiving content from a content source, obtaining an IPv6 address for the content, converting the IPv6 address for the content into a file name compatible with a file system of the storage node, and storing the content at the storage node using the file name.

Also described herein is a method of addressing content for storage in a storage node of a network implementing Internet Protocol version 6 (IPv6), the method comprising: receiving content from a content source; associating metadata with the received content; generating an IPv6 address for the content wherein the IPv6 address incorporates an identifier of the content and the metadata; and storing the content associated with the generated IPv6 address in the storage node of the network.

Also described herein is a method of retrieving content stored in a network, the method comprising: receiving a request for content from a requesting node in an IPv6 network, the request comprising an IPv6 address associated with the content; mapping the received request to a file name for the content based on the IPv6 address in the received request; identifying the content using the file name mapped to the IPv6 address; and transmitting the requested content to the requesting node.

There are also described herein apparatus, network devices and networks for implementing the methods described herein. In addition, a computer program, computer program product and computer readable medium comprising instructions for implementing the methods described herein is disclosed.

EXAMPLE EMBODIMENTS

Networks such as local area networks and wide area networks can be implemented between nodes or network devices and are often utilised for distributing data for storage within the network device and for later retrieval of that data. One example of a wide area network is the internet. Nodes of the network may request data from one another. They can do this in one of two ways they can either address a request to another node, the request including details of the data being requested, or they can address a request directly to the required data.

Figure 1:
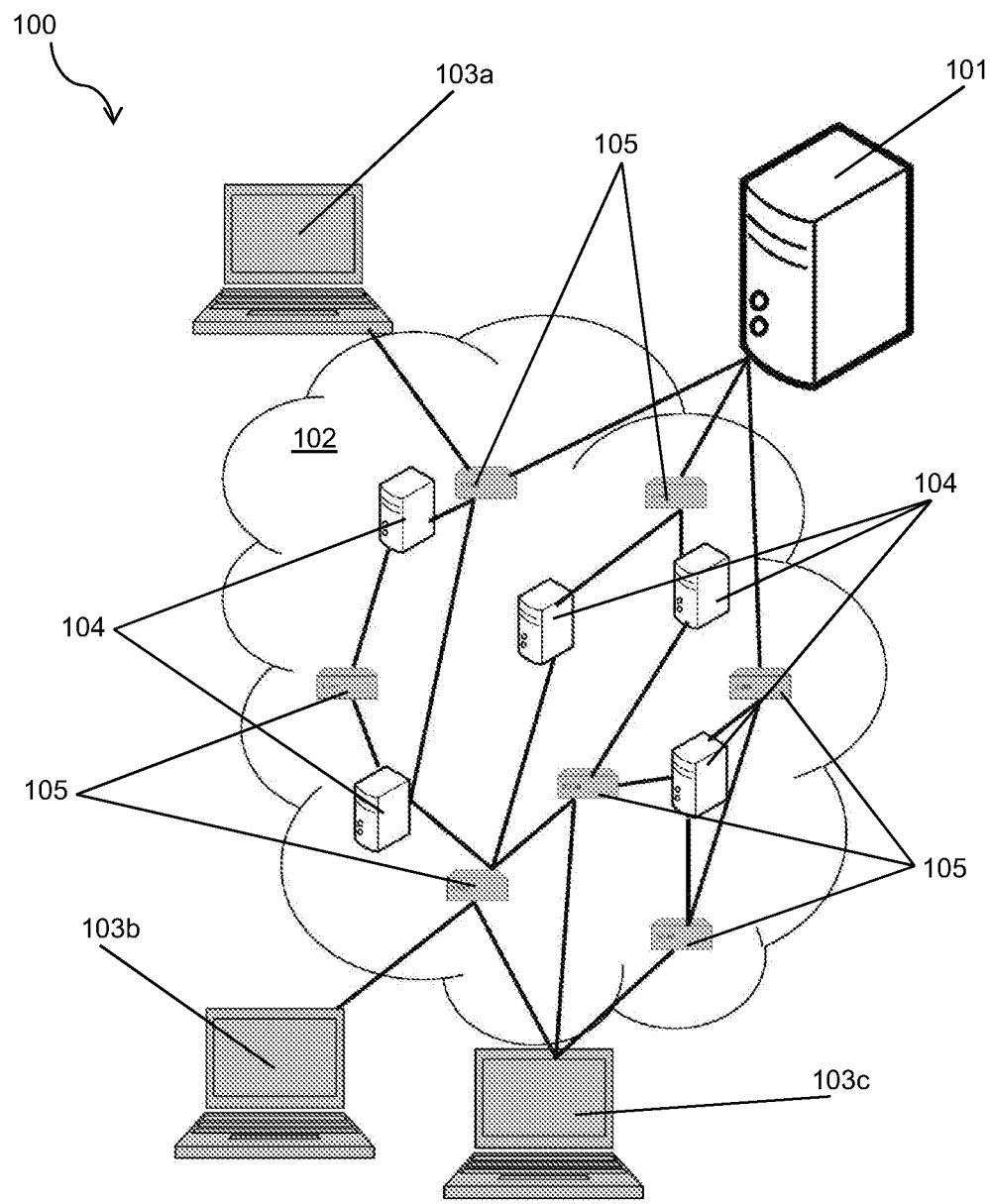
FIG. 1 shows an overview of a network in which embodiments may be implemented.

The network forming the internet is made up of a large number of interconnected nodes. These nodes include clients, switches, servers, routers and other such devices and the nodes can communicate using many different protocols at different layers of the OSI model, but in particular the Internet Protocol version 4 (IPv4) communications protocol. Nodes in the network can be addressed using static or dynamic IPv4 addresses, some of which are globally-reachable but many of which are specific to a local network segment FIG. 1 shows a standard network configuration 100 with clients (or consumers, or users) 103*a-c*, a main server 101, routers 105 and caches 104. Note that identical numbering has been used for features which are functionally equivalent to one another, e.g. all the caches 104, and all the routers 105. This should be interpreted as meaning that each cache has broadly the same functionality as each other cache, although the exact content stored on each, and the technical capabilities of each may vary. Similarly, each router 105 is arranged to operate in broadly the same way as each other router, and importantly they are all interoperable with each other, but specific functioning and capabilities may vary between routers.

Figure 2:
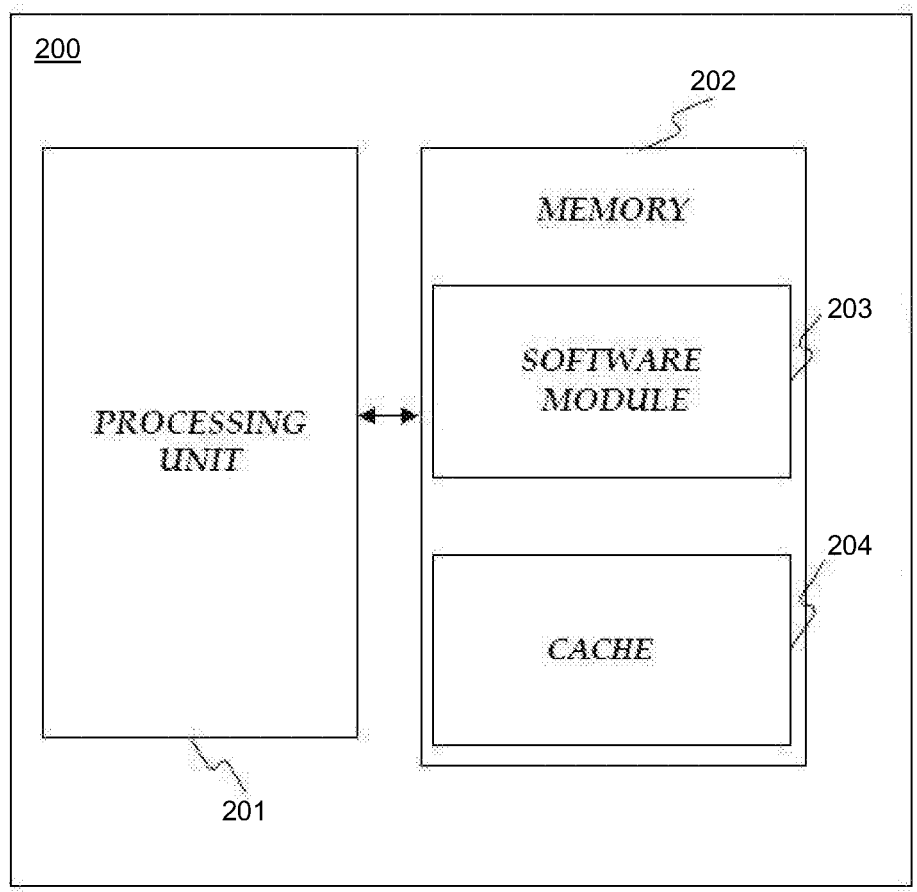
FIG. 2 shows a block diagram representative of a router or server.

FIG. 2 shows a block diagram of a network node having a network cache 200. The cache has within a cache memory 202 that is used to store content that can be accessed by other nodes on the network. Addresses in this memory 202 are assigned by several algorithms; most commonly the content most recently requested by one of the end point nodes that the server serves are stored.

FIG. 1 shows clients 103*a-c* and illustrates how they can receive data over a network 102, which could be the internet, for example. A request from a client 103 is forwarded to a cache 104, based on known routing policies. If the cache 104 does not have the exact content requested, it can either redirect the request to another node, for example it may redirect the request to a main server 101 that is the provider of the content.

Typically, routing is performed using Internet Protocol (IP) addresses. The IP version currently in use is IPv4, which uses 32 bits to provide a unique address to every node on a network. This provides a little over 4 billion addresses, and it has been recognised for some time that the rate of growth of the internet is quickly rendering this number inadequate. To solve this problem, a new version of the Internet Protocol has been developed. This new version, IPv6, uses 128 bit addresses, allowing a total of around 3.4×1038 addresses.

A server usually serves a plurality of endpoint nodes across the network as is shown in FIG. 1. This means that the server may have to deal with multiple requests at the same time. If these requests together ask for more resources than the server or network (e.g. network bandwidth) can provide, then load balancing may be required. Load balancing is where traffic from nodes is redirected and distributed across a group of servers so that the requests can be fulfilled. It may also be the case that the requests cannot be fulfilled. For example many nodes may request a high quality of multimedia content and it may not be possible to deliver this simultaneously to all of the nodes. Therefore an inferior level of content may be delivered to at least some of the nodes in order not to overload the network but nevertheless still transmit the content (albeit at a lower quality than requested) to the nodes.

IPv6

IPv6 is an updated version of the internet protocol and is intended to replace IPv4. IPv4 and IPv6 are not designed to be interoperable. IPv6 uses a 128 bit address and these addresses are represented by eight groups of four hexadecimal digits.

IPv6 networks provide auto-configuration capabilities, enabling automatic assignment of an IP address to a device for example based on the device's Media Access Control (MAC) address. IPv6 networks are simpler, flatter and more manageable, especially for large installations. Direct addressing of nodes from anywhere in the network is possible due to the vast IPv6 address space, which enable the use of globally-unique addresses, and the need for network address translation (NAT) devices is effectively eliminated. An IPv6 address is designed to consist of two parts, a 64 bit prefix that is used for routing and a 64 bit interface identifier. The interface identifier was originally designed to identify a host's network interface, for example by using a hardware address such as the MAC address of the interface. However it has been appreciated that the interface identifier does not have to be used for this purpose. To this end some embodiments described herein utilise the interface identifier to identify content instead. Therefore content, whether it is a page, article or piece of multimedia content, can have its own IP address. This means that instead of routing to a particular node in the network, traffic will route to specific content. Large data files such as streams of media content, are often divided into chunks or segments of data as described below and, in this case, each chunk will preferably have its own address. An IPv6 network implementing this idea of content-addressing may be termed a 6CN or IPv6 Content Network.

FIG. 3A illustrates an IPv6 request, showing the structure of the 128 bit address. The address comprises an initial portion known as a prefix, which typically indicates the content provider, and helps to route the request to the correct nodes. The rest of the address narrows down to the specific content required. For example, this may be broadly the title of a movie, which may narrow further to a specific chunk of that movie. Further narrowing may occur when variants of this chunk are specified by progressively later bits of the address.

An advantage of the IPv6 system is that each variant of each chunk can have a separate address. Moreover, as shown in FIGS. 3A to 3C, the variants can have similar addresses to one another, such that the same bits in the address of any chunk can be used to relate to the same variant type. To give a specific example, there may be four different resolutions at which any given chunk of content may supplied. Therefore two bits of the address, for example the 90th and 91st bits may represent the four available resolutions. By using the IPv6 addresses in this way, it is simple for the network to determine not just whether it has the requested contents, but also whether it has similar content, for example, the same chunk at a different resolution.

In this way, parts of the address act like flags to denote various parameters of the chunk to which they relate. Of course, any logical scheme for denoting variants can be chosen by a content provider, depending on the variants they plan to offer.

Figure 3:
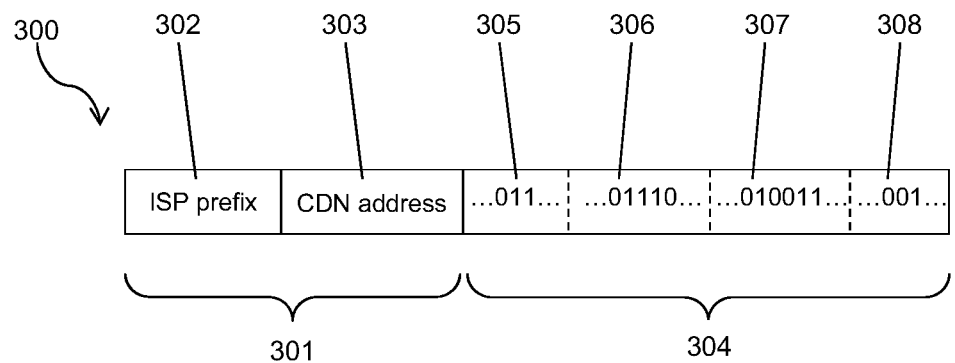
FIG. 3 illustrates an exemplary embodiment of an IPv6 address.

When a network receives a request from a client, it examines the full address (which in IPv6 can be the address of the actual content, not just a network node), and determines whether it is aware of a route towards the address. Examples of an IPv6 address is shown in FIG. 3. In this figure, the IPv6 address 300 has a routing portion 301 at the beginning and a content portion 304 at the end. The routing portion is used to route requests to the correct node in the network, much in the same way that an IPv4 address is used to deliver content and requests to the correct network location. The routing portion 301 comprises an ISP prefix 302 and a CDN address 303. It is possible, however, to route directly to content, in which case the routing portion 301 may be dispensed with in favour of an expanded content portion 304.

The content portion 304 comprises content and variant flags 305, 306, 307, 308. These are segregated from one another by dashed lines to indicate that the content provider is free to subdivide the content portion 304 according to their own requirements. The content and variant flags may represent various aspects of the content. For example, portion 305 may represent the name of the content, or some other identifier to determine it. To give a specific example, portion 305 may represent the name of a movie, or the title (or the series and episode number) of an episode of a television show.

To further narrow down to a specific piece of content, portion 306 may represent a variant of the content, for example, it may represent content having a particular bit rate, or screen resolution, or in a particular file format.

Narrowing yet further, portion 307 may specify a particular chunk of the content, for example the first 5 minutes of the movie designated by portion 305, while portion 308 may represent further information defining the chunk. In the event that content has not been chunked, the fields identifying chunk information can be set to 0, as a default to indicate that there is no chunk information, as the content has not been broken down into chunks.

Note that by defining a set of rules for interpreting addresses, particular chunk of content, once a piece of content, e.g. a movie has been allocated an portion of the address space, the addresses of the chunks, and the addresses of the variants of the chunks are easy to determine. Of course, the order in which portions 305, 306, 307 and 308 are presented can be varied according to a particular content provider's requirements. Indeed, there may be more or fewer subdivisions of the content portion 304, according to specific requirements.

Domain Name System

The DNS is a decentralised naming system for nodes connected to the internet. It is used to associate URLs or domain names with IPv4 addresses. DNS can be implemented to work the same way with IPv6, however now it can also associate content, or a combination of content name and URL with an IPv6 address.

Information Centric Networking (ICN)

Information Centric Networking (ICN) provides a network paradigm in which the data or information in the network forms the basis around which information is distributed and routed within the network.

Each chunk of content has an individual ICN name, which is usually largely human-readable, for example cisco.com/newsitem1.txt/chunk1. An ICN network routes data and requests for that data based on the ICN name. In particular, data chunks are requested by name by ICN applications in content requests or interest packets. Routing techniques, in particular hierarchical routing techniques such as longest-prefix matching, are then applied in order to locate and retrieve the content. A whole item of content is obtained by requesting all of the chunks that make up that content and a list of the relevant chunks can be obtained from a manifest file or data file listing the relevant chunk names. Sometimes an intelligent ICN application can predict multiple chunk names based on a name of a single chunk, for example cisco.com/newsitem1.txt/chunk2 might follow cisco.com/newsitem1.txt/chunk1.

Reverse path information can be inserted into the request or interest packet on its route to the content so that the network knows how to route the data back though the network to the requesting device. More commonly, however, reverse path information can be stored in the nodes on the outbound path in a technique that can be termed "breadcrumb" routing, so that the content can follow the breadcrumb trail of small data packets left in the outbound network devices, to get back to the requesting network device.

Chunks of data are commonly cached in intermediate nodes on the way back through the network. These data chunks can be served directly from those caches in order to serve later requests.

As described in more detail below, ICN applications can control the rate at which requests for data are sent, hence adjusting the sending rate of the content chunks to enable congestion control. In this way, receiver driven transport protocols can be implemented, which are driven by the device requesting and receiving the content. An ICN transport protocol can also further segment the chunks to enable transmission over the network as necessary.

Internet-layer protocols such as IPv4 and IPv6 are not directly relevant to the implementation of a pure ICN network, but they are sometimes present in the network, in particular as an underlay for example to create point-to-point UDP tunnels.

Chunking and Retrieval of Media Content in a Network

Media content (both audio and video) can be divided into chunks or segments for both storage in and delivery over a network. In that way, for example, media content that can be of many hours duration (such as a film or broadcast of a sporting event) can be divided into a number of segments of shorter playback time (such as between 1 second and 1 minute, preferably 1-30 seconds).

When a network device, such as a client end user device, requests particular media content, such as a particular video file, it needs to obtain all of the chunks of data that make up that media content.

One way of streaming media content using chunking is to use a technique such as Dynamic Adaptive Streaming over HTTP (DASH) or HTTP Live Streaming (HLS), which allow adaptive bit rate streaming of media content, stored as chunks in a network of one or more HTTP servers, to a network destination requesting the data.

Prior to storage, the media content is divided into shorter chunks or segments and alternative versions of each chunk are stored at various servers in the network. The alternative versions may be, for example, encoded at different bit rates or may have different formats for playback through a variety of different end user devices (Internet connected TVs, set top boxes, mobile devices including smartphones, laptops etc.)

When the content chunks are created, a DASH manifest file is also created, which identifies the chunks of data necessary to recreate the whole stream of media content, including details of alternative chunks (for example those that are encoded at different bit rates). If using HLS, the manifest would be an HLS manifest, for example an .m3u or .m3u8 playlist in which chunks of content are identified by a URL in accordance with HLS syntax and semantics.

Separate DASH manifest files may be created for different formats or encodings of a particular stream of media content, such that a set top box would be working from a different DASH manifest to that used by a smartphone.

The DASH manifest typically also includes an indication of the location of each of the chunks. However, when dealing with consecutive or aggregate chunks, a manifest template can be used to group multiple chunks that follow a regular format into one description. This can enable easier parsing of the manifest file.

Based on the manifest, the end user device can retrieve and reconstruct the full media content at the highest bit rate (or from any other representation described in the manifest) currently available to it over the network. In particular, the end user device can obtain subsequent chunks identified in the manifest while decoding and displaying a current chunk.

The location of each chunk (or sequence of chunks with a particular encoding or at a particular resolution) can be identified by adding suffixes to a base URL, which can then be interpreted by network components such as DNS servers, to direct the request to an appropriate destination at which the requested content is stored.

Such a naming scheme can be used in both IPv4 and IPv6 networks and is a consequence of the classical HTTP naming scheme where the URL indicates the server to talk to (the FQDN) then a "path" locally interpreted by the said server pointing at the requested content. e.g. http://<fqdn>/<the-internal-server-location-of-the-piece-of-content-I-want-to-get>

Hence, location can be specified by adding more specific location details to the right-hand-side of a URL. Hence, in a DASH manifest, once a base URL has been defined (for example a particular server on which a group of chunks is hosted), locations such as directories on a particular server can be further defined by adding location details to the right-hand-side of the base URL. A base URL may be a Fully Qualified Domain Name (FQDN) or absolute address identifying the full location of the relevant server such that it is reachable from anywhere on the network. The FQDN may also be termed a DNS name.

Typically an entry in the DASH manifest is used to build up a filename Most of the time the model to build a URL used by the device to request a chunk is defined by some XML regular expression called the segment template in DASH formatting, such as:

<SegmentTemplate timescale="96"media="bunny_$Bandwidth bps/BigBuckBunny_4s$Number.m4s" startNumber="1" duration="384"initialization="bunny_$Bandwidth$bps/BigBuckBunny_4s_init.mp4"\>

The "Segment Template" XML section also contains information to find the player initialization file (one per bitrate in this example). In addition the manifest also contains other information, or metadata, used by the player to know what the frame rate is etc.

This template is used by the device to create the right hand side of the full URL, the missing part of the URL (inc the FQDN) conventionally points to the place where the dash manifest is in the HTTP server Template Generation As described above, chunk locations can be identified in a DASH manifest implemented on an IPv4 network by further specifying a base URL. However, in an IPv6 network in which chunks of data are addressed directly with their own IPv6 addresses, the IPv6 address of each chunk (and potentially each version of each chunk) will be different, so the IPv6 address in the DASH manifest needs to be adapted for each chunk.

As described in more detail below, in the present IPv6 content-centric network the FQDN (an IPv6 address or a DNS AAAA record) is used as a unique identifier pointing at the requested content.

Most of the time the content chunks of a given duration (e.g. a 4 sec) are grouped in the same directory in which available bit rates are grouped.

For example:

```
4sec/
4sec/BigBuckBunny_4s_simple_2014_05_09.txt
4sec/bunny_1008699bps
4sec/ bunny_1008699bps/BigBuckBunny_4s1.m4s
.....
4sec/ bunny_1008699bps/BigBuckBunny_4s10.m4s
```

In addition to the above, the dash manifest also contains an AdaptationSet giving information such as image resolution, aspect ratio, frame rate etc. An example format might be:

<AdaptationSet segmentAlignment="true" group="1" maxWidth="480" maxHeight="360" maxFrameRate="24" par="4:3">

Since 6CN does not require any full URL description, the idea here is to use the same strategy to build up an IPv6 address or an FQDN.

In an IPv6 content network (6cn), the v6 addresses identifying a chunk follow some coding convention and might look like:

6cn_prefix:content_id:profile:duration:chunk_id

6cn_prefix identifies a 6cn system without carrying any particular signification in the context of this invention. The skilled persons will appreciate that other address coding conventions could be used within the context of the present system.

content_id: defines the full content (Big-Buck-Bunny from the above example profile: identifies other content attributes such as the codec, the frame rate, the resolution etc.

duration: chunk individual duration chunk_id: current chunk number

By way of a non-limiting convention, chunk #000 identifies the initialisation file used by the player to initialize the video decoder with parameters applicable to all chunks.

By way of a further non-limiting convention, the manifest itself is often identified as the last possible chunk number (for example 0xefff if this corresponds to the number of chunks of the content).

In one implementation, an existing IPv4 manifest may be converted into an IPv6 manifest. Each entry in the IPv6 manifest, which may simply be an IPv6 address, encodes all of the information about the chunk that was previously in the IPv4 manifest.

The ability can be maintained to translate between a content-based addressing scheme and a server or node-based addressing scheme by reformatting the data to enable back and forth representations between an address identifying content chunks and traditional manifest representations. For example, a mapping may be enabled between a classical URL and a URL directed to the host part when IPv6 addresses are used to directly denote contents. In a classical URL format the host section denoting the server (or its DNS name) can be the IPv6 address of the server.

To implement this system, it can be convenient to extract the full description from an existing content, in particular when the manifest contains a template used by the player to create each URL chunk. As noted above, the full description cannot be limited to the DASH manifest since the manifest typically only applies to the directory in which it is.

In the general case, since a DASH manifest is fundamentally a list of URLs the URL chunks could be anything. In particular, a URL contained in the manifest may be a full URL that is directly usable by a server.

The content_id field of the 6CN address is conventional as it refers to the whole content.

In a particular exemplary implementation, the full description information is used to code the Sprofile (bunny_1008699 bps combined with internal manifest information such as the one provided in the AdaptationSet. The $duration field of the 6CN chunk addresses is also extracted from this full description.

In one embodiment, each .m4s file from the existing hierarchy represents one chunk of a given profile. The file name can therefore be used to create the Schunk_id of the resulting 6CN address.

For example:

```
4sec/
4sec/BigBuckBunny_4s_simple_2014_05_09.txt
4sec/bunny_1008699bps
4sec/ bunny_1008699bps/BigBuckBunny_4s1.m4s
.....
4sec/ bunny_1008699bps/BigBuckBunny_4s10.m4s
```

BigBuckBunny_4s10.m4s will get the following 6CN v6 address:

6CN_prefix:BigBuckBunny:1280_720_1008699 bps_24 fps_mp4:4 sec:0x0002

The skilled person will appreciate that this principle can be extended to other content having other associated content names and metadata.

It also important to note that the above is just an example of how a v6 address can be formed but any other addressing template could work too (e.g. the profile could be encoded as part of content_id, thus a movie in HD and the same in SD would have different content_id.

In a further embodiment that may be implemented in conjunction with the first implementation, in keeping a mapping that can be addressed using the Template language, we can easily move between a filename, an IPv6 address, and an FQDN (DNS name).

In particular, in one embodiment, an existing DASH or HLS manifest containing a classical Uniform Resource Locator (URL) such as:

http://<content-server-fqdn>\<the-server-location-of-the-piece-of-content-I-want-to-get> can be rewritten as a URL with an IPv6 address, the IPv6 address preferably pointing directly to the content in a content networking (6CN) setup such as:

http://<ipv6-address-of-the-piece-of-content-I-want-to-get>

The rewritten URL gives access to the same content as the classical URL in a transparent way (from a user device perspective).

The rewritten URL can be stored in a IPv6-based manifest for the content.

As will be appreciated by the skilled person from the present disclosure, the rewritten IPv6 address may be generated based on one or more properties of the content including: an identifier of the content provider or source of the content, an identifier of the specific content itself, the server location of the content, a version type, encoding type or length of the content, stream type, service ID, chunk ID, codec, frame rate, content descriptor, profile and duration of the content.

The section below describes a mechanism for a possible reverse mapping, which can be used internally by the physical streamers to find the actual content corresponding to the v6 address the said streamer received a request for.

In particular, an ASCII representation of the address can be used to identify the physical file in which the chunk is stored. This just requires renaming the initial .m4s file (or content of another format) with the main difference that this time the new filename gives all the chunk information as it is just another representation (ASCII) of the content information.

An example might be:
6CN_prefix-BigBuckBunny-1280_720_1008699 bps_24 fps_mp4-4sec-0x0002

The corresponding address v6, 6CN address might be represented as e.g. 2001:420:44f1:1a01:c15c::ed0a:2

The ASCII representation of the address (which might be used as a local file name) could be something like:
2001-420-44f1-1a01-c15c--ed0a-2

Hence the filename can be used to give all of the chunk information. In particular, when a request is received on the basis of a particular IPv6 address, this is translated to ASCII, which provides the filename to look for on the server, that is it identifies the physical file.

Similarly the ASCII representation of the 6CN address can be used as an FQDN so that http://6CN_prefix-BigBuckBunny-1280_720_1008699 bps_24 fps_mp4-4 sec:0x0002.6cn.io/is a perfectly valid URL, a DNS lookup giving back the same 6CN v6 address for that chunk.

All of the above can be applied to any file retrieval system, not just chunked content. In that case, the "chunk ID" field becomes meaningless, but this could be set to a default.

FIG. 4 illustrates schematically the structure of an exemplary IPv6 address including an element that identifies the chunk address, in this case the second half of the IPv6 address. As illustrated in FIG. 4, the chunk address can contain information or metadata relating to the chunk of content. In the exemplary embodiment shown, the chunk address is contains information such as stream type, service ID, content descriptor, profile and duration of the content. It will be appreciated that this information can then be extracted from the IPv6 address as the content is requested or delivered through the network, as described herein.

In a further embodiment, which may be implemented in conjunction with the systems and methods described above, content descriptors and identifiers may be used in order to define a directory structure for the content within a storage node. In particular, in a classical URL such as http://<content-server-fqdn>/<the-server-location-of-the-piece-of-content-I-want-to-get> the <the-server-location-of-the-piece-of-content-I-want-to-get> part can be used to map to an internal file in the cache file system hierarchy. One way to achieve this is to remap the internal file system hierarchy on the URL hierarchy:

http://content-server/video/4sec/bunny_1008699 bps/BigBuckBunny_4s1.m for instance would be internally mapped by the content server to Sdocument_root/video/4 sec/bunny_1008699 bps/BigBuckBunny_4s1.m local file (document_root representing the root of the cache in the local server file system).

In an IPv6-based 6CN system, however, a URL based on an IPv6 address "http://content_prefix::content_id" could be reformatted and mapped on Sdocument_root/content_prefix/content_id file with "content_prefix" and "content_id" being an ascii representation of the IPv6 address in which for instance all ":" can be replaced by "_" to make the file name compatible with the file system naming convention. Hence the IPv6 address may be used to define a suitable directory structure for storage of content that will be understandable by the storage node and the nodes can map the storage file name onto an IPv6 address and vice versa.

In summary, the methods and systems described herein can be used to allow sequenced chunks of the content that are naturally part of an aggregate described in some dash manifest to be encoded in IPv6 addresses, FQDNs and/or filenames used by a filesystem connected to a content streamer, etc. to allow easy and algorithmic mapping between one another at the content level, as well as the ability to access a single item (chunk) within the aggregate within each encoding. Since this mapping is a pure bijection it is easy to move from the v6 address to filename to FQDN representations spaces.

Since IPv6 addresses can be globally reachable, the network can determine the server from which to provide the content. Hence a base URL no longer needs to be encoded in a manifest. The content can remain globally reachable even if it moves physical server.

The present disclosure also envisages one or more computer programs, computer program products or logic encoded in computer-readable media for implementing any method claimed or described herein. It will be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

Throughout the description, references to components or nodes of the network should be construed broadly, and in particular may comprise several subcomponents or modules working in combination to achieve the stated effects. These subcomponents may themselves be implemented in hardware or software. Likewise, many different components may be combined together as one component, for example a single processor may carry out many functions simultaneously. Similarly, any reference to operational steps may comprise hardware, software, or a combination of the two. As already noted, any method described herein, or any part thereof may be carried out by a computer program, or a computer program product.

References herein to components being connected to one another should be interpreted as meaning either directly connected, or indirectly connected, for example being connected via other components. Indeed, in the case of complex networks, components may be both directly and indirectly connected to one another. Examples of such connection may commonly include, but are not limited to: electronic connections through wires or cables; fibre optic connections; and wireless communication, for example via radio waves, microwaves or infrared.

In the present disclosure, references to networks should be interpreted broadly. In particular, the internet is often used as an example of a network, but is not limiting. The principles set out herein are applicable to all networks, comprising a collection of processors connected to one another. Connection may be direct, or via switches and routers. The network may further comprise servers and caches, depending on the exact nature of the network. When storage is discussed herein, this may include, without limitation one or more of magnetic, optical, solid state, volatile or non-volatile memory.

The steps associated with the methods of the present disclosure may vary. Steps may be added, removed, altered, combined, and reordered without departing from the scope of the present disclosure. Indeed, different aspects and embodiments of the disclosure herein may be combined with one another, in any combination and may be implemented in conjunction with one another in a particular network. In particular, individual components, and systems of components may be combined, the tasks of a single component divided between many subcomponents, or equivalent components interchanged without departing from the principles set out herein. Furthermore, features of one aspect may be applied to other aspects of the system.

Therefore, the present examples are to be considered as illustrative and not restrictive, and the examples are not to be limited to the details given herein, but may be modified within the scope of the appended claims.

The invention claimed is:

1. A method of enabling access to content in a network implementing Internet Protocol version 6 (IPv6), the method comprising:
accessing a content addressing file, the content addressing file comprising a plurality of entries, each entry comprising a content portion location associated with the content portion;
creating the IPv6 version of the content addressing file, wherein creating the IPv6 version of the content addressing file comprises:
extracting for an entry the content portion location associated with the content portion;
forming, based on the content portion location, a section of an IPv6 address for the content portion, wherein forming the section of the IPv6 address for the content portion based on the content portion location comprises forming an IPv6 prefix of the IPv6 address, the IPv6 prefix comprising the IPv6 address of the content portion; and
appending a content portion identifier for the content portion to the IPv6 prefix; and
generating a Uniform Resource Locator (URL) comprising the section of the IPv6 address formed based on the content portion identifier.

2. The method of claim 1, further comprising changing file name of the content on the server to be based on the IPv6 address.

3. The method of claim 1, further comprising:
appending a duration of the content portion.

4. The method of claim 1, further comprising:
appending a chunk identifier of the content portion.

5. The method of claim 1, further comprising:
appending a profile identifier and a duration the content portion.

6. The method of claim 1, wherein each entry further comprises at least one of the following: the content portion identifier and metadata associated with the content portion.

7. The method of claim 6, wherein forming the section of the IPv6 address is further based on at least one of the following: the content portion identifier and the metadata associated with the content portion.

8. The method of claim 6, wherein the metadata comprises at least one of the following: content portion length; a codec; frame rate; resolution; and duration.

9. A system comprising:
a memory storage; and
a processing unit coupled to the memory storage, wherein the processing unit is operative to:
access a content addressing file, the content addressing file comprising a plurality of entries, each entry comprising a content portion location associated with the content portion;
create the IPv6 version of the content addressing file, wherein the processing unit being operative to create the IPv6 version of the content addressing file comprises the processing unit being operative to:
extract for an entry the content portion location associated with the content portion;
form, based on the content portion location, a section of an IPv6 address for the content portion, wherein the processing unit being operative form the section of the IPv6 address for the content portion based on the content portion location comprises the processing unit being operative form an IPv6 prefix of the IPv6 address, the IPv6 prefix comprising an IPv6 address of the content portion; and
append a content portion identifier for the content portion to the IPv6 prefix; and
generate a Uniform Resource Locator (URL) comprising the section of the IPv6 address formed based on the content portion identifier.

10. The system of claim 9, wherein the processing unit is further operative to: append a duration of the content portion.

11. The system of claim 9, wherein the processing unit is further operative to: append a chunk identifier of the content portion.

12. The system of claim 9, wherein the processing unit is further operative to: append a profile identifier and a duration the content portion.

13. The system of claim 9 wherein each entry further comprises at least one of the following: the content portion identifier and metadata associated with the content portion.

14. A non-transitory computer readable medium that stores a set of instructions which when executed perform a method executed by the set of instructions comprising:

accessing a content addressing file, the content addressing file comprising a plurality of entries, each entry comprising a content portion location associated with the content portion;

creating the IPv6 version of the content addressing file, wherein creating the IPv6 version of the content addressing file comprises:

extracting for an entry the content portion location associated with the content portion;

forming, based on the content portion location, a section of an IPv6 address for the content portion, wherein forming the section of the IPv6 address for the content portion based on the content portion location comprises forming an IPv6 prefix of the IPv6 address, the IPv6 prefix comprising an IPv6 address of the content portion; and appending a content portion identifier for the content portion to the IPv6 prefix; and generating a Uniform Resource Locator (URL) comprising the section of the IPv6 address formed based on the content portion identifier.

15. The non-transitory computer readable medium of claim 14, further comprising: appending a duration of the content portion.

16. The non-transitory computer readable medium of claim 14, further comprising: appending a chunk identifier of the content portion.

17. The non-transitory computer readable medium of claim 14, further comprising: appending a profile identifier and a duration the content portion.

* * * * *